United States Patent [19]
Decker et al.

[11] 3,837,430
[45] Sept. 24, 1974

[54] METHOD FOR THE MAINTENANCE OF THE OIL PRESSURE IN A CIRCULATION LUBRICATION SYSTEM FOR HIGHLY LOADED JOURNAL BEARINGS

[75] Inventors: Hanns Decker; Heinz Hurtmanns, both of Cologne, Germany

[73] Assignee: Klockner-Humboldt-Deutz Aktiengesellschaft, Koln, Germany

[22] Filed: Sept. 21, 1972

[21] Appl. No.: 290,992

[30] Foreign Application Priority Data
Sept. 23, 1971 Germany............................ 2147557

[52] U.S. Cl..................... 184/1 E, 184/6.1, 184/6.4
[51] Int. Cl............................................ F16n 29/02
[58] Field of Search.............. 184/6.3, 6.4, 6.1, 1 E; 123/196 S; 241/176, 285

[56] References Cited
UNITED STATES PATENTS

| | | | |
|---|---|---|---|
| 2,838,039 | 6/1958 | Smith et al...................... | 184/6.3 X |
| 2,871,981 | 2/1959 | Baits .................................. | 184/6.4 |
| 3,374,863 | 3/1968 | Kozlowski et al................... | 184/6.3 |
| 3,658,153 | 4/1972 | Berman............................... | 184/6.3 |
| 3,720,288 | 3/1973 | Tschabold.......................... | 184/6.4 |

FOREIGN PATENTS OR APPLICATIONS

| | | | |
|---|---|---|---|
| 674,493 | 6/1952 | Great Britain ....................... | 184/6.4 |
| 1,079,392 | 5/1954 | France................................. | 184/6.4 |

*Primary Examiner*—Manuel A. Antonakas
*Attorney, Agent, or Firm*—Hill, Gross, Simpson, Van Santen, Steadman, Chiara & Simpson

[57] ABSTRACT

For the maintenance of the oil pressure in a circulation lubrication system for heavy duty friction bearings in large crushing machines a motor-driven main pump and a motor-driven auxiliary pump are used, with pressure responsive regulators arranged in the pressure lines of these pumps. Electric circuits are used which are controlled by said regulators in such a manner that the main oil pump is put into operation only after the auxiliary oil pump has produced a predetermined minimum oil pressure in said lubricating system, while the auxiliary oil pump is subsequently disconnected by the said electric circuit means when the main oil pump has raised the oil pressure in said lubricating system to the desired higher operating pressure.

7 Claims, 1 Drawing Figure

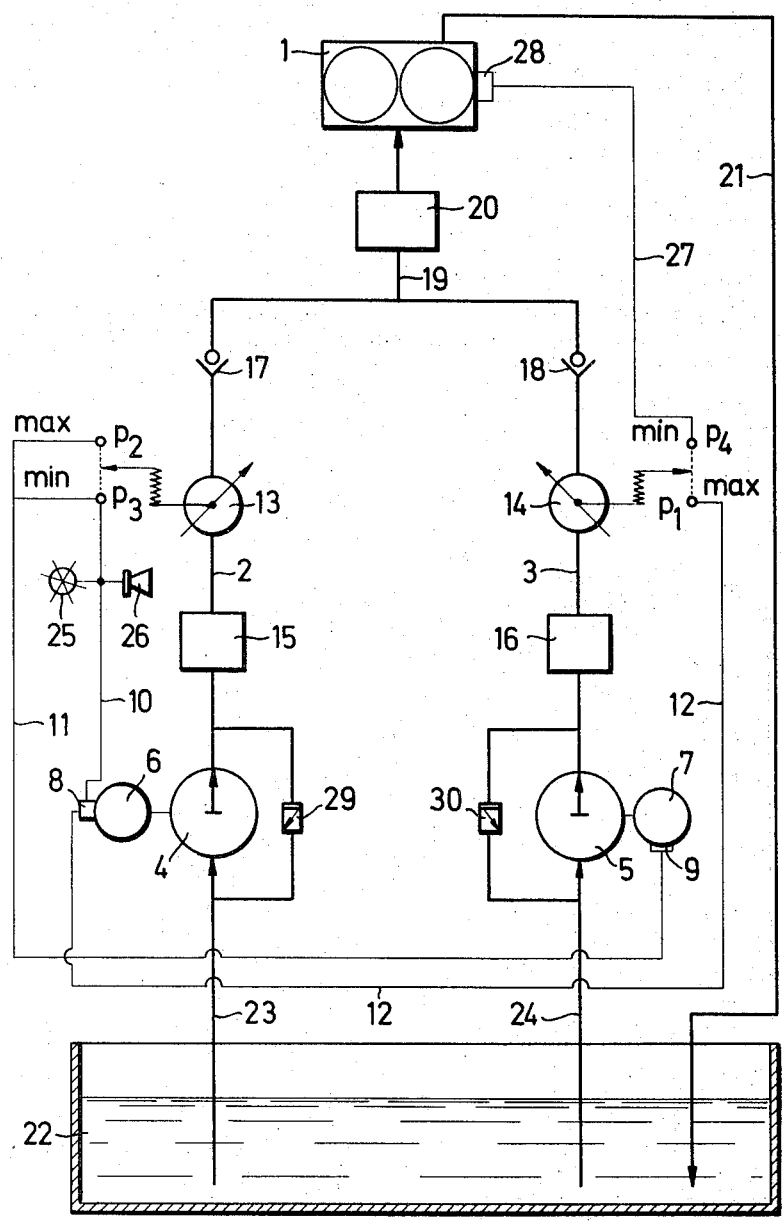

METHOD FOR THE MAINTENANCE OF THE OIL PRESSURE IN A CIRCULATION LUBRICATION SYSTEM FOR HIGHLY LOADED JOURNAL BEARINGS

The invention relates to a method for maintenance of the oil pressure in a circulation lubrication system for heavy duty friction bearings, particularly for friction bearings in crushing machines with a main oil pump and an auxiliary oil pump the drive motors of which are provided with switches which over pressure responsive regulators in the oil circulation system are respectively closed and opened.

In large gyratory crushers and tube mills the operating reliability depends to a great extent upon sufficient lubrication of the heavy duty friction bearings. As shown in actual practice, in these crushing machines which frequently operate continuously for days at a time, even a small pressure decrease which may be caused by wear of the pump or by clogging of a filter, substantial damages to the friction bearings and the machine may occur. If for instance in a gyratory crusher the circulatory oil lubrication fails completely, the eccentric bushings and the cone bearings will jam already after about 20 seconds. The reinstatement of the crusher into operation is connected with high costs. It is true that heretofore attempts have been made in connection with such machines to by-pass the pressure decrease in the circulation lubrication system by coupling to the main oil pump a reserve, or auxiliary, oil pump which in case of failure of the main oil pump through a suitable coupling device is placed in operation and takes over the oil circulation lubrication. However, with such an arrangement it is impossible to avoid that such an intense decrease of the oil pressure in the circulation lubrication system occurs that the time period required for the auxiliary oil pump to achieve its operational pressure is not sufficient to supply the heavily loaded friction bearing with a sufficient amount of oil. The result is overheating of the friction bearings which may cause increased wear of the bearings and thereby operational disturbances.

The object of the invention is to provide a method which under avoidance of the above-mentioned disadvantages renders possible a more reliable oil circulation lubrication in machines with heavy duty friction bearings. This object is achieved through such an arrangement that the main oil pump is not put into operation until after the auxiliary oil pump has produced a minimum pressure $P_1$, and that the auxiliary oil pump after attainment of the operating pressure $P_2$ by the main oil pump is shut off, and vice versa. In this manner the result is achieved that already at a small decrease in the oil pressure to a value determined by the regulator and lying only slightly below the normal operating pressure, the auxiliary oil pump is put into operation and takes over the oil delivery in the machine. It is self-evident that the minimum pressure $P_1$ at which the auxiliary pump is connected and disconnected, respectively, is sufficiently high to even at such pressure ensure a sufficient supply of oil to the friction bearings. The oil pressure in the circulation lubrication system can therefore in case of failure of a pump or a filter not drop below the value required for sufficient supply to the loaded friction layers.

Thus, in accordance with the method of the invention a sufficiently high pressure for supplying oil to the friction bearings can always be maintained in the circulation lubrication system and thereby the crushing machine be protected from time-wasting and expensive operational disturbances. Another advantage of the method of the invention is that at each starting of the machine the auxiliary oil pump is automatically tested with regard to its operability.

In accordance with another object of the invention the pressure-responsive regulator arranged in the flow direction behind the main oil pump is so adjusted that in case of decrease of the operating pressure $P_2$ to a predetermined minimum pressure $P_3$ the auxiliary oil pump is placed in operation and/or an optical and/or acoustical signal device is actuated. In this manner the operating personnel is alerted to the fact that a disturbance has taken place in the oil circulation lubrication system. Since in such a case the auxiliary pump has taken over the supplying of lubricating oil to the friction bearings, the operation of the crushing machine can be continued without interruption and the cause of the disturbance can be determined by the operating personnel and eliminated. For the purpose of increasing the safety of operation of the oil circulating lubrication system the oil pressure $P_3$ may be adjusted to a higher value than the minimum pressure $P_1$.

According to a further object of the invention the pressure-responsive regulator which, seen in the direction of flow, is disposed behind the auxiliary oil pump, is additionally adjusted to a pressure $P_4$ which lies below the minimum pressure $P_1$ of the auxiliary oil pump and is so coupled with the switch of the main drive motor of the crushing machine as to place the same in operation in case of rising pressure and to prevent such operation in case of decreasing pressure. Through this arrangement the crushing machine can advantageously not be put into operation until the friction bearings are sufficiently supplied with lubricant by the oil pump.

The method according to the invention will now be described in greater detail with reference to the accompanying diagrammatic drawing.

In accordance with the invention the circulation lubricating system of a gyratory crusher 1 comprises oil supply lines 2 and 3, a main oil pump 4 and an auxiliary oil pump 5. The main oil pump 4 is driven by an electric motor 6 controlled by a switch 8, and the auxiliary oil pump 5 is driven by an electric motor 7 controlled by an electric switch 9. The switches 8 and 9 are connected by electric lines 10, 11 and 12 with pressure-responsive regulators 13 and 14 which are arranged in the oil supply lines 2 and 3, respectively. The regulators 13 and 14 may, for instance, comprise pressure switches which are constructed in such a manner that they respond to mechanical, hydraulic, pneumatic or electric pulses. Behind the oil pumps 4, 5 and the regulators 13, 14 — viewed in the flow direction — there are arranged oil filters 15 and 16 in the oil lines 2 and 3. Furthermore, check valves 17 and 18 are preferably arranged in the oil lines 2 and 3, respectively. The oil lines 2 and 3 are behind said check valves connected to a common line 19 which over a cooler 20 lead to the friction bearings of the gyratory crusher 1. The gyratory crusher 1 is also provided with an oil return line 21 which discharges the oil into an oil pan 22 into which also suction lines 23 and 24 extend.

An electric conduit 10 has arranged therein an optical signal means 25 and an acoustic signal means 26.

Electrical conduits 11 and 12 are connected to minimum and maximum contacts of the regulators 13 and 14, respectively. The minimum contact of the regulator 14 is connected by an electric conduit 27 with a motor switch 28 controlling the drive motor of the gyratory crusher 1. Furthermore, the oil pumps 4 and 5 are provided with safety valves 29 and 30, respectively.

In accordance with the method of the invention the auxiliary oil pump 5 is started prior to the starting of the gyratory crusher 1 so that a pressure builds up in the oil lines 3 and 19. After attainment of the predetermined lowest oil pressure $P_4$ which ensures a sufficient lubrication of the friction bearings of the crushing machine 1 during idling, the crushing machine 1 is started with the aid of the regulator 14. In this manner all the friction bearings of the crushing machine 1 are already during the starting procedure supplied with a sufficient amount of oil, so that they cannot become overheated.

After the auxiliary pump 5 has established a somewhat higher predetermined minimum pressure $P_1$, the regulator 14 connects the maximum contact with the conduit 12 and over the switch 8 of the motor 6 the main oil pump 4 is set into operation. The auxiliary oil pump 5 remains in operation together with the main oil pump 4 until the main oil pump 4 has attained the operating pressure $P_2$. As soon as the main oil pump 4 has attained the operating pressure $P_2$, the regulator 13 in the oil line 2 connects the maximum contact with the conduit 11 and the auxiliary oil pump 5 is shut off through disconnection of the motor 7 by means of the motor switch 9. At the same time, however, as a result of the oil pressure in the pressure line 2 the check valve 18 in line 3 is automatically closed and thereby the regulator 14 is shut off from the circulation network on the pressure side, so that it no longer can be actuated by the pressure produced by the main oil pump 4.

The oil which is drawn by the main oil pump 4 from the oil pan 22 is cleaned by the filter 15 and cooled in the cooler 20 before it reaches the friction bearings of the crushing machine 1 through line 19. After passing through the friction journal bearings of the crushing machine 1 the oil is returned through line 21 to the oil pan 22 from which it is again drawn by the main oil pump 4 in the described manner and circulates through the crushing machine 1.

If during the operation of the crushing machine through clogging of the filter 15 or other disturbances the pressure in the oil lines decreased below the predetermined operating pressure, then when the predetermined minimum pressure $P_3$ is reached, which suitably is higher than the minimum pressure $P_1$ of the auxiliary pump 5, the minimum contact is closed and over conduit 11 causes the motor 7 to start and thereby puts the auxiliary pump 5 into operation. At the same time, however, the minimum contact of the main oil pump 4 is put out of operation over the minimum contact of said main pump and the optical as well as the acoustical signal means 25 and 26 are actuated. These signal devices inform the operating personnel that the main pump 4 has dropped out. The created disturbance may then be eliminated by the operating personnel without stopping the crushing machine 1 since during this time the friction bearings of the crusher are sufficiently supplied with lubricating oil by the auxiliary oil pump 5. After the disturbance has been corrected the operating personnel again connects the main pump 4 so that the latter now supplies the circulation lubricating system with oil. After the operating pressure has been attained, the auxiliary oil pump 5 is disconnected in the described manner. In the event that during the stoppage of the main oil pump 4 an additional disturbance occurs in the line 3 of the auxiliary oil pump 5 and the pressure in said line 3 drops to a predetermined minimum then, with the aid of the regulator 14, the minimum contact is actuated and over the conduit 27 the drive motor of the crushing machine 1 is stopped so that the crushing machine comes to a standstill. It will be noted that also in this last mentioned case the invention makes provision for preventing damage to the friction bearings of the crushing machine.

It should be noted that in accordance with the method of the invention all friction bearings of the crushing machine are advantageously supplied with sufficient oil even if there should occur disturbances in the oil lines, filters and the like, or in the event that one of the pumps of the system should fail. This ensures not only a substantial increase in the operational safety but also reduces the maintenance cost of the system compared with the known lubricating systems for crushing machines.

What we claim is:

1. Method of maintaining the oil pressure in a circulation lubrication system for friction bearings, particularly for the friction bearings in crushing machines in which said circulation lubrication system includes a motor-driven main oil pump and a motor-driven auxiliary oil pump provided with switches controlled by pressure responsive regulators arranged in the oil circulation system, said method comprising the steps of: putting the auxiliary oil pump in operation; putting the main oil pump in operation only after the operating auxiliary oil pump has produced in said oil circulation system a predetermined minimum pressure; subsequently taking said auxiliary oil pump out of operation when the main oil pump has raised the pressure in said oil circulation system to the desired operating pressure; and putting the auxiliary oil pump back into operation and taking the main oil pump out of operation in response to a pressure decrease in said oil circulation system to a predetermined minimum pressure.

2. Method according to claim 1, including the step of protecting said regulators by means of check valves arranged in the oil lines between said pressure regulators and a common oil supply line leading to said crushing machine and connecting said pressure regulators with the pressure sides of said oil pumps.

3. In a circulation lubrication system, a motor-driven processing machine, heavy duty friction bearings mounted in said motor-driven processing machine, a pressure line connected to said friction bearings, a main oil pump discharging into said pressure line leading to said friction bearings, another pressure line leading to said friction bearings, an auxiliary oil pump discharging into said other pressure line leading to said friction bearings, an electric motor for each one of said pumps to drive the same, a pressure responsive regulator arranged in each one of said pressure lines, electric circuit means controlled by said pressure responsive regulators of which one when the pressure produced by said auxiliary oil pump reaches a predetermined low value causes said motor-driven processing machine to start and operate, while in response to a somewhat higher minimum value of said oil pressure produced by said auxiliary oil pump said pressure responsive regulator causes the electric circuit of said motor connected with said main oil pump to be closed so that said main oil pump is operated to increase the oil pressure to the prescribed higher operating pressure, the other one of said pressure responsive regulators causing said circuit means to disconnect the motor during operation of said auxiliary oil pump to stop the latter when said main oil pump produces said prescribed higher operating pressure.

4. A lubricating system according to claim 3, comprising a common oil supply line connected to said friction bearings and check valves arranged in the oil lines between said pressure regulators and said common oil supply line leading to said processing machine, said pressure regulators connected with the pressure sides of said oil pumps, the pressure regulator connected with said main oil pump being adjusted in such a manner that upon decrease of the operating pressure to a predetermined minimum value the auxiliary oil pump is put into operation.

5. A lubricating system according to claim 3, comprising a common oil supply line connected to said friction bearings and check valves arranged in the oil lines between said pressure regulators and said common oil supply line leading to said processing machine, said pressure regulators connected with the pressure sides of said oil pumps, the pressure regulator connected with said auxiliary oil pump being adjusted to a pressure which lies below the minimum operating pressure of said auxiliary oil pump and which causes a disconnection of the processing machine.

6. A lubricating system according to claim 3, comprising a common oil supply line connected to said friction bearings and check valves arranged in the oil lines between said pressure regulators and said common oil supply line leading to said processing machine, said pressure regulators connected with the pressure sides of said oil pumps, the pressure regulator connected with said main oil pump being adjusted in such a manner that upon decrease of the operating pressure to a predetermined minimum value the auxiliary oil pump is put into operation, and a signal device connected to said main oil pump and operated in response to the decrease of pressure to said predetermined minimum value.

7. A lubricating system according to claim 3, including a signal means connected with said electric circuit means which is caused to be operated by said other pressure responsive means when the oil pressure produced by said main oil pump decreases to a value slightly above said somewhat higher minimum value, whereby at the same time said auxiliary oil pump is again caused to operate and said main oil pump is stopped.

* * * * *